United States Patent [19]

Hungerford, Jr.

[11] Patent Number: 4,982,920

[45] Date of Patent: Jan. 8, 1991

[54] PIPE CLAMP FOR CONNECTING WITH A WOODEN JOIST OR OTHER FRAME MEMBER

[76] Inventor: Charles S. Hungerford, Jr., 6 Beechwood Ct., Woodbury, Conn. 06798

[21] Appl. No.: 882,780

[22] Filed: Jul. 7, 1986

[51] Int. Cl.⁵ .............................................. F16L 3/00
[52] U.S. Cl. .................................... 248/71; 248/74.4; 24/487
[58] Field of Search ............... 248/547, 58, 62, 67.5, 248/71, 74.1, 74.2, 74.4, 216.1, 217.2, 316.6; 24/487, 543, 20 TT, 20 EE

[56] References Cited

U.S. PATENT DOCUMENTS

| | | | |
|---|---|---|---|
| 1,163,132 | 12/1915 | Ette | 248/547 |
| 1,325,472 | 12/1919 | Ide | 248/547 |
| 2,266,274 | 12/1941 | Schroeder | 248/547 |
| 2,288,439 | 6/1942 | Dahm | 248/547 |
| 3,226,065 | 12/1965 | Smith | 248/547 |
| 3,802,655 | 4/1974 | Schuplin | 248/74.1 |
| 3,809,371 | 5/1974 | Martini | 24/543 |
| 3,913,187 | 10/1975 | Okuda | 24/543 |
| 4,291,855 | 9/1981 | Schenkel | 248/74.1 |
| 4,356,599 | 11/1982 | Larson | 24/487 |
| 4,581,481 | 4/1986 | Moretti | 24/487 |

FOREIGN PATENT DOCUMENTS

| 2099289 | 12/1982 | United Kingdom | 248/62 |
|---|---|---|---|
| 2130077 | 5/1984 | United Kingdom | 248/65 |

*Primary Examiner*—Ramon O. Ramirez
*Assistant Examiner*—Robert A. Olson
*Attorney, Agent, or Firm*—Bachman & LaPointe

[57] ABSTRACT

A unitary device for supporting a pipe or other conduit operable to make a secure connection to a wooden joist or other frame member.

2 Claims, 1 Drawing Sheet

PIPE CLAMP FOR CONNECTING WITH A WOODEN JOIST OR OTHER FRAME MEMBER

CROSS-REFERENCED TO RELATED APPLICATIONS

The present invention is related to U.S. Pat. No. 4,291,855 and to co-pending U.S. patent application Ser. No. 859,332 filed May 5, 1986, by C. S. Hungerford, Jr.

BACKGROUND OF THE INVENTION

The present invention relates to pipe or conduit saddles or clamps and in particular, to a saddle or clamp which is designed to be connected to a wooden joist or other frame members.

SUMMARY OF THE INVENTION

It is a principal object of the present invention to provide a pipe clamp or pipe saddle which is adapted to be secured to a wooden joist or other frame member.

A further feature of the invention is the provision of a pipe clamp having special structure facilitating the reception of fastener means for securing the clamp to a frame member.

A still further feature is the provision of a clamp device of the type disclosed in said '855 patent which includes at least one post found integrally with the clamp for receiving a fastener operative to connect the clamp to a frame member.

A further feature of the invention is the provision of a bore formed in the post leading to a guide means for maintaining proper alignment of a fastener driven through the bore into a frame member.

A clamp device embracing certain principles of the present invention may comprise a body including an integrally formed post element, a pair of arcuate, interlocking straps hinged individually to the body, and a bore formed in the post element for receiving a fastener for connecting the clamp device to the frame member.

Other features and advantages of the present invention will become more apparent from our examination of the succeeding specification when read in conjunction with the appended drawings in which:

DETAILED DESCRIPTION OF PRIOR ART DEVICE OF FIG. 1

Figure 1:
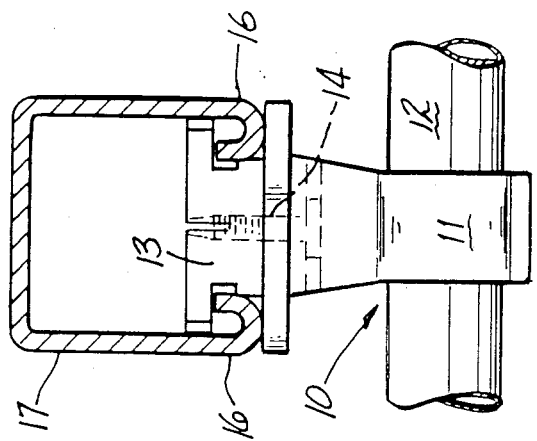
FIG. 1 is a representation of a prior art pipe clamp connected to a metallic channel.

The clamp device of FIG. 1 is similar to the units disclosed and described in U.S. Pat. No. 4,291,855 and in copending U.S. patent application Ser. No. 859,332, filed May 5, 1986, entitled "A Connector Device for Supporting a Conduit in a Flange Channel", by C. S. Hungerford, Jr., in which a saddle or clamp 10 having releasable straps 11, supporting a pipe 12 is secured to a connector 13 by a screw 14. The connector 13 in turn engages the return bends or flanges 16 of a classic metal channel 17 to complete the connection.

DETAILED DESCRIPTION OF THE PREFERRED EMBODIMENTS

Figure 2:
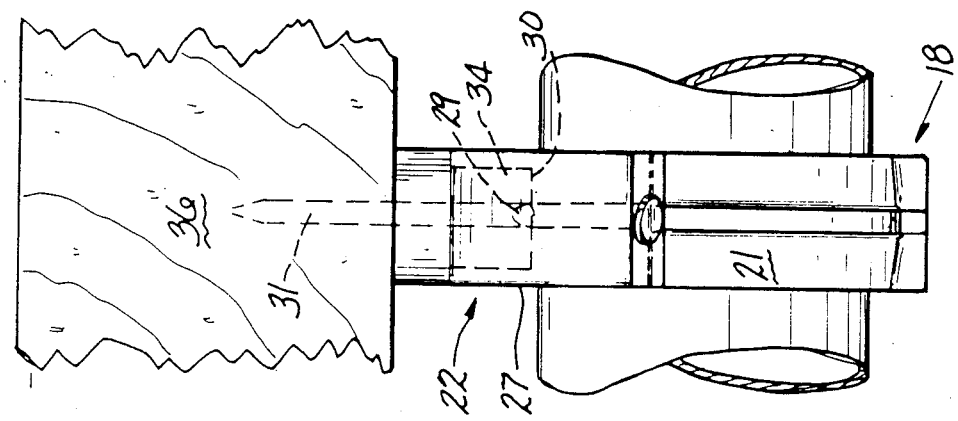
FIG. 2 is a side elevation of the clamp of the present invention shown secured to a wooden frame member.
Figure 3:
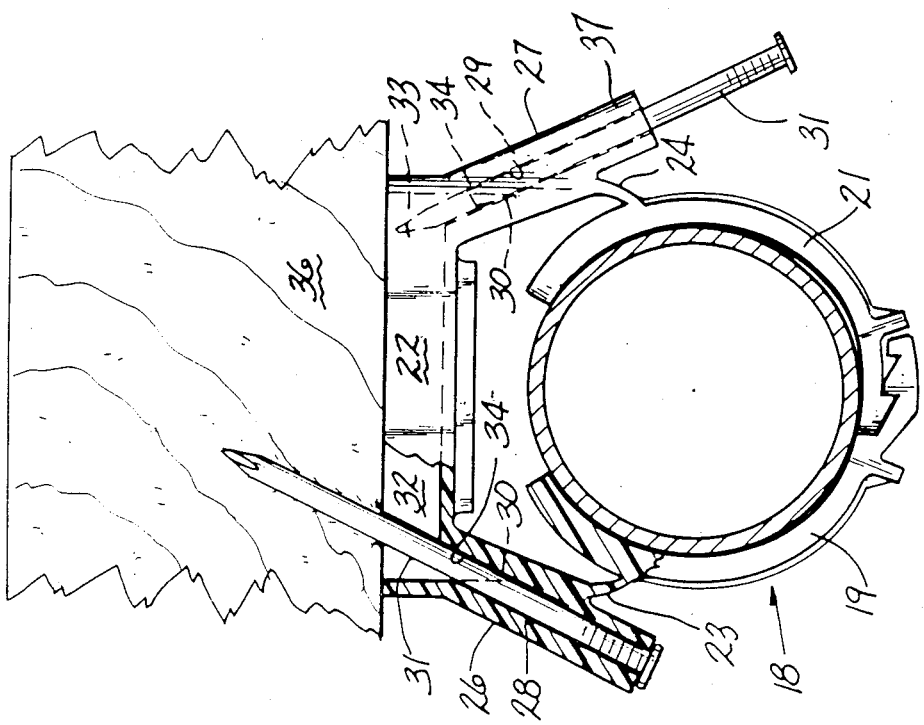
FIG. 3 is a left side view of the illustration of FIG. 2 with parts broken away for clarity.

Referring to FIGS. 2 and 3, a clamp device indicated generally at 18 includes interlocking straps 19 and 21 hinged to a clamp body 22 at 23 and 24, respectively.

The body 22 includes posts 26 and 27 having bores 28 and 29 (first guide means) for receiving a fastener such as a nail 31.

The body also includes spaced recesses or voids 32 and 33 portions of which define a V-shaped configuration in cross-section.

The bores 28 and 29 intersect the respective voids 32 and 33 at the apices 30 of the V-shaped configuration.

One sidewall 34 of each void defines a guide means (second guide means) in the forum of a flat planar surface which is tangent to the mating bore.

In effect, the guide means is an extension of a portion of the wall of the adjacent bore.

Thus, a nail received in the bore 28, for example, is guided along sidewall 34 facilitating entry of the nail into frame member 36.

While two posts 26 and 27 are shown it is entirely wherein the spirit and scope of the invention to fabricate the clamp device with a single post. One post is fully operative but two posts are desirable when the load is heavy. In addition, the posts preferably are provided with extensions 37 which allow for hammering of nail 31 without damage to hinges 23 and 24.

In all configurations, the clamp device is molded from suitable resinous material to generate a one piece unitary piece part.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A clamp device for supporting a pipe or a conduit operable to make a connection with a joist or other frame member comprising:
    a body including a pair of integrally formed post elements, said post elements being disposed on opposite sides of said body and each flaring outwardly and away from each other such as to form a substantially V-shaped configuration with said body;
    a hinge element projecting from each of said post elements towards one another into said V-shaped configuration;
    an arcuate strap member secured to each of said hinge elements such that said strap members are operable with each other to engage or release a pipe;
    a first guide means defining a bore formed in the post elements for receiving and directing a fastener for connecting the clamp device to the frame member wherein the first guide means is formed with an external extension to provide hammer-head clearance thereby avoiding inadvertent mutilation of the adjacent hinge and strap member; and
    a second guide means formed by said body contiguous with said bore for further directing said fastener thereby increasing the integrity of said first guide means and insuring proper alignment of said fastener prior to driving the fastener.

2. The clamp device of claim 1 in which the second guide means defined an internal extension of said first guide means whereby the internal and external extensions in combination with said first guide means and said body provide a rigid receptacle for said fastener.

* * * * *